United States Patent
Sasaki et al.

(10) Patent No.: US 11,402,679 B2
(45) Date of Patent: Aug. 2, 2022

(54) LIQUID CRYSTAL DISPLAY DEVICE WHEREIN A TIME AVERAGE OF VOLTAGE APPLIED BETWEEN A PIXEL ELECTRODE AND A REFLECTIVE ELECTRODE IS SUBSTANTIALLY THE SAME IN A MAXIMUM AND MINIMUM GRAY SCALE DISPLAY STATE

(71) Applicant: Sharp Kabushiki Kaisha, Sakai (JP)

(72) Inventors: Takahiro Sasaki, Sakai (JP); Takashi Satoh, Sakai (JP); Ming Ni, Sakai (JP); Shuji Nishi, Sakai (JP); Keiichi Ina, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/506,927

(22) Filed: Oct. 21, 2021

(65) Prior Publication Data
US 2022/0137446 A1    May 5, 2022

(30) Foreign Application Priority Data
Oct. 29, 2020    (JP) .............................. JP2020-181839

(51) Int. Cl.
*G02F 1/133*    (2006.01)
*G02F 1/1343*    (2006.01)
(Continued)

(52) U.S. Cl.
CPC ...... *G02F 1/13306* (2013.01); *G02F 1/13439* (2013.01); *G02F 1/133345* (2013.01);
(Continued)

(58) Field of Classification Search
CPC .................................................. G02F 2203/30
See application file for complete search history.

(56) References Cited

U.S. PATENT DOCUMENTS

| 8,692,758 B2 | 4/2014 | Matsuda et al. |
| 2006/0050208 A1* | 3/2006 | Enomoto .......... G02F 1/133555 349/114 |

(Continued)

FOREIGN PATENT DOCUMENTS

| JP | 2000-122094 A | 4/2000 |
| JP | 3394926 B2 | 4/2003 |

(Continued)

*Primary Examiner* — Paul C Lee
(74) *Attorney, Agent, or Firm* — Keating & Bennett, LLP

(57) ABSTRACT

A liquid crystal display device includes a first substrate, a second substrate, a vertical alignment liquid crystal layer, and a plurality of pixels. Each of the pixels includes a reflective region for performing display in a reflection mode. The first substrate includes a reflective electrode including a first region located within each of the plurality of pixels and a second region located between any two pixels, of the plurality of pixels, adjacent to each other, a transparent insulating layer provided to cover the reflective electrode, and a pixel electrode formed from a transparent conductive material and provided on the transparent insulating layer in each of the plurality of pixels. The second substrate includes a counter electrode. Voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels. A time average of voltage applied between the pixel electrode and the reflective electrode is substantially the same between a maximum gray scale display state and a minimum gray scale display state.

8 Claims, 10 Drawing Sheets

(51) Int. Cl.
  *G02F 1/1333*  (2006.01)
  *G02F 1/1337*  (2006.01)
  *G02F 1/1335*  (2006.01)

(52) U.S. Cl.
  CPC .. *G02F 1/133504* (2013.01); *G02F 1/133553* (2013.01); *G02F 1/133742* (2021.01); *G02F 1/134336* (2013.01); *G02F 2203/02* (2013.01); *G02F 2203/30* (2013.01)

(56) References Cited

U.S. PATENT DOCUMENTS

| | | |
|---|---|---|
| 2010/0295841 A1 | 11/2010 | Matsuda et al. |
| 2013/0320334 A1 | 12/2013 | Yamazaki et al. |
| 2014/0125933 A1* | 5/2014 | Tamaki ............. G02F 1/1396 349/114 |

FOREIGN PATENT DOCUMENTS

| | | |
|---|---|---|
| JP | 2003-131268 A | 5/2003 |
| JP | 3469663 B2 | 11/2003 |
| JP | 5036864 B2 | 9/2012 |
| JP | 2014-007399 A | 1/2014 |

\* cited by examiner

LIQUID CRYSTAL DISPLAY DEVICE WHEREIN A TIME AVERAGE OF VOLTAGE APPLIED BETWEEN A PIXEL ELECTRODE AND A REFLECTIVE ELECTRODE IS SUBSTANTIALLY THE SAME IN A MAXIMUM AND MINIMUM GRAY SCALE DISPLAY STATE

CROSS-REFERENCE TO RELATED APPLICATIONS

This application claims the benefit of priority to Japanese Patent Application Number 2020-181839 filed on Oct. 29, 2020. The entire contents of the above-identified application are hereby incorporated by reference.

BACKGROUND

Technical Field

The present disclosure relates to a liquid crystal display device, and particularly relates to a liquid crystal display device in which each pixel includes a reflective region.

Liquid crystal display devices are roughly classified into transmissive liquid crystal display devices and reflective liquid crystal display devices. Transmissive liquid crystal display devices perform display in a transmission mode using light emitted from a backlight. Reflective liquid crystal display devices perform display in a reflection mode using ambient light. A liquid crystal display device has been proposed in which each pixel includes a reflective region for displaying in the reflection mode, and a transmissive region for displaying in the transmission mode. Such a liquid crystal display device is referred to as a transflective or a transmissive/reflective liquid crystal display device.

Reflective and transflective liquid crystal display devices are, for example, suitable for use as medium or small display devices for mobile applications used outside. An example of the reflective liquid crystal display device is disclosed in JP 2000-122094 A. An example of the transflective liquid crystal display device is disclosed in JP 2003-131268 A.

SUMMARY

In reflective and transflective liquid crystal display devices, that is, liquid crystal display devices including a region (reflective region) in which each pixel performs displaying in the reflection mode, there has been a demand for further improving efficiency of use of light (reflectance) during display in the reflection mode (that is, for even brighter display in the reflection mode).

The present disclosure has been made in view of the task described above, and an object of the present disclosure is to improve reflectance and to achieve brighter display than that achieved in the related art in liquid crystal display devices including reflective regions in which each pixel performs displaying in the reflection mode.

The present specification discloses a liquid crystal display device according to the following items.

Item 1

A liquid crystal display device including:
a first substrate;
a second substrate opposite to the first substrate;
a vertical alignment liquid crystal layer provided between the first substrate and the second substrate; and
a plurality of pixels arranged in a matrix shape including a plurality of rows and a plurality of columns,
wherein each of the plurality of pixels includes a reflective region for performing display in a reflection mode,
the first substrate includes
a reflective electrode including a first region located within each of the plurality of pixels and a second region located between any two pixels, of the plurality of pixels, adjacent to each other,
a transparent insulating layer provided to cover the reflective electrode, and
a pixel electrode formed from a transparent conductive material and provided on the transparent insulating layer in each of the plurality of pixels,
the second substrate includes a counter electrode provided opposite to the pixel electrode and the reflective electrode,
voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels, and
a time average of voltage applied between the pixel electrode and the reflective electrode is substantially the same between a maximum gray scale display state and a minimum gray scale display state.

Item 2

The liquid crystal display device according to item 1, wherein the reflective electrode is in an electrically floating state.

Item 3

The liquid crystal display device according to item 1, wherein a ground potential is provided to the reflective electrode.

Item 4

The liquid crystal display device according to any one of items 1 to 3, wherein each of the plurality of pixels further includes a transmissive region for performing display in a transmission mode, and the pixel electrode is partially located in the transmissive region.

Item 5

The liquid crystal display device according to any one of items 1 to 4, wherein the counter electrode is formed from a transparent conductive material.

Item 6

The liquid crystal display device according to any one of items 1 to 5, wherein the first region and the second region of the reflective electrode each have a concave-convex surface structure.

Item 7

The liquid crystal display device according to any one of items 1 to 5 further including:
a light scattering layer provided more on an observer side than the liquid crystal layer.

Item 8

The liquid crystal display device according to any one of items 1 to 7, further including:
memory circuits connected to the plurality of pixels, respectively.

With embodiments of the present disclosure, it is possible to improve reflectance from known configurations to achieve brighter displaying than that achieved by known configurations in liquid crystal display devices including reflective regions in which each pixel performs display in the reflection mode.

BRIEF DESCRIPTION OF DRAWINGS

The disclosure will be described with reference to the accompanying drawings, wherein like numbers reference like elements.

DESCRIPTION OF EMBODIMENTS

Hereinafter, embodiments of the present disclosure will be described with reference to the accompanying drawings. Note that the present disclosure is not limited to the embodiments to be described below.

First Embodiment

Figure 1:
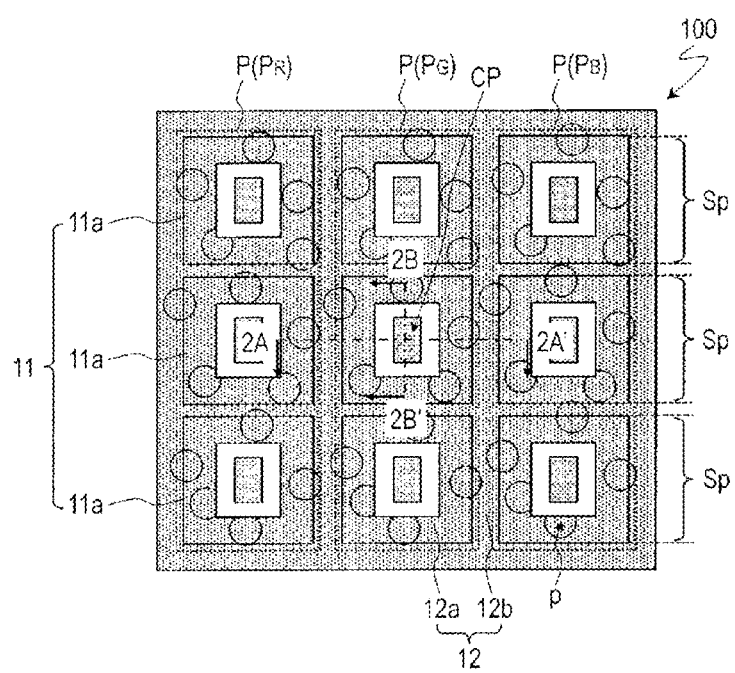
FIG. 1 is a plan view schematically illustrating a liquid crystal display device 100 according to an embodiment of the present disclosure and illustrates a region corresponding to three pixels P of the liquid crystal display device 100.
Figure 2A:
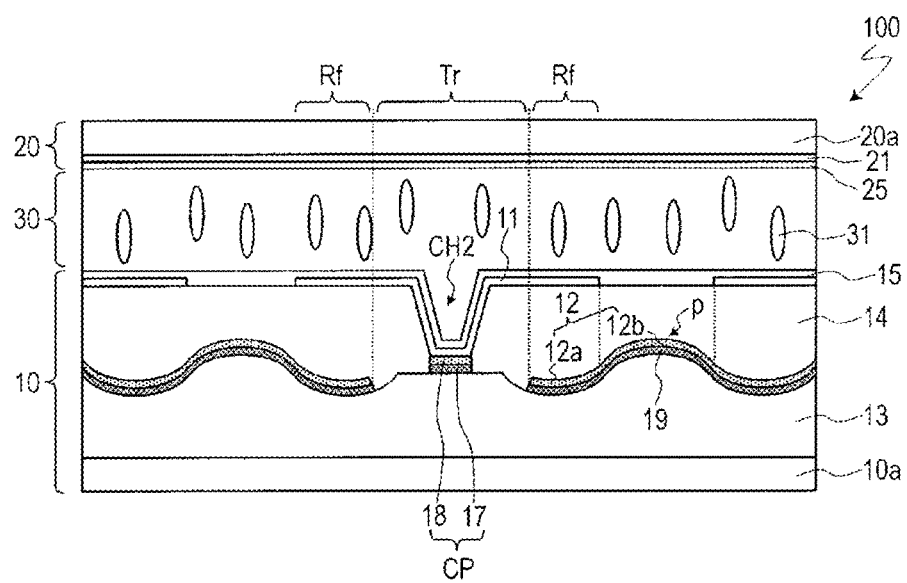
FIG. 2A is a cross-sectional view schematically illustrating the liquid crystal display device 100 and illustrates a cross-sectional structure along a line 2A-2A' in FIG. 1.
Figure 2B:
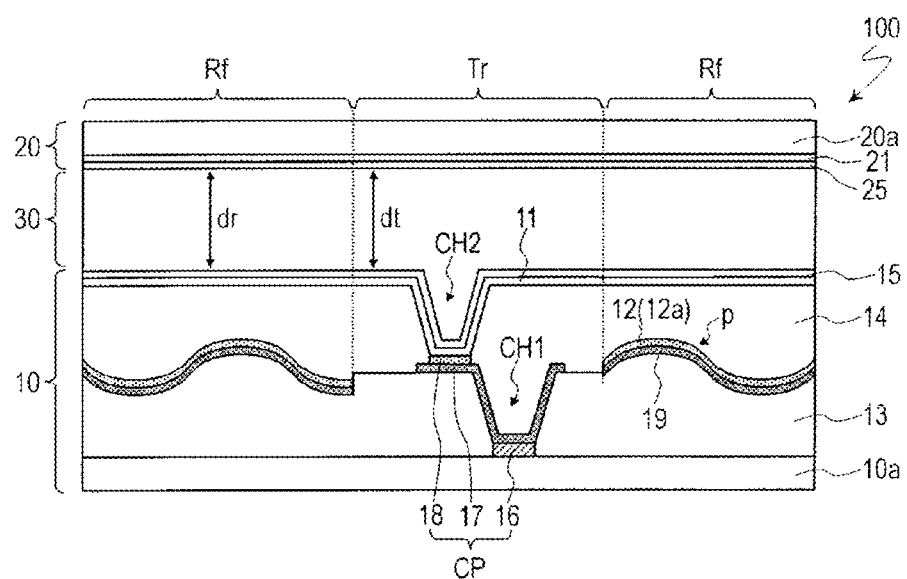
FIG. 2B is a cross-sectional view schematically illustrating the liquid crystal display device 100, and illustrates a cross-sectional structure taken along a line 2B-2B' in FIG. 1.

A liquid crystal display device 100 according to the present embodiment will be described with reference to FIG. 1, FIG. 2A, and FIG. 2B. The liquid crystal display device 100 of the present embodiment is a transflective (transmissive/reflective) liquid crystal display device. FIG. 1 is a plan view schematically illustrating the liquid crystal display device 100 and illustrates a region corresponding to three pixels P in the liquid crystal display device 100. FIG. 2A and FIG. 2B are cross-sectional views schematically illustrating the liquid crystal display device 100 and illustrate cross-sectional structures along the lines 2A-2A' and 2B-2B' in FIG. 1, respectively.

The liquid crystal display device 100 includes a plurality of pixels P as illustrated in FIG. 1. The plurality of pixels P are arrayed in a matrix shape including a plurality of rows and a plurality of columns. The plurality of pixels P typically include red pixels $P_R$ that display red, green pixels $P_G$ that display green, and blue pixels $P_B$ that display blue.

As illustrated in FIGS. 2A to 2B, the liquid crystal display device 100 includes a TFT substrate (first substrate) 10, a counter substrate (second substrate) 20 opposite to the TFT substrate 10, and a vertical alignment liquid crystal layer 30 provided between the TFT substrate 10 and the counter substrate 20. Each pixel P includes a reflective region Rf for display in a reflection mode, and a transmissive region Tr for display in a transmission mode. In the illustrated example, a thickness (cell gap) dt of the liquid crystal layer 30 in the transmissive region Tr and a thickness (cell gap) dr of the liquid crystal layer 30 in the reflective region Rf are the same (thus, dt=dr). The area of the transmissive region Tr occupying the pixel P may be appropriately set depending on the application and the like, and is, for example, 20% or more and 90% or less. The position and the shape of the transmissive region Tr within the pixel P may also be appropriately set depending on the application or the like.

The TFT substrate 10 includes a pixel electrode 11 provided to each of the plurality of pixels P, and a reflective electrode 12 located on a side opposite to the liquid crystal layer 30 with respect to the pixel electrode 11 (in other words, more toward a back face side than the pixel electrode 11). The TFT substrate 10 further includes a first interlayer insulating layer 13, a second interlayer insulating layer 14, a contact portion CP, and a first alignment film 15.

The constituent elements of the TFT substrate 10 (the pixel electrode 11 and the like described above) are supported by a substrate 10a. The substrate 10a is, for example, a glass substrate or a plastic substrate.

A circuit (backplane circuit) (not illustrated) for driving pixels P is formed on the substrate 10a. Here, the backplane circuit has a memory circuit (SRAM for example) connected to each of the plurality of pixels P. A liquid crystal display device in which the memory circuit is provided for each pixel P may be referred to as a "memory liquid crystal". Specific configurations of a memory liquid crystal are disclosed in, for example, JP 5036864 B (corresponding to U.S. Pat. No. 8,692,758). The entire disclosures of JP 5036864 B and U.S. Pat. No. 8,692,758 are incorporated herein by reference.

The first interlayer insulating layer 13 is provided to cover the backplane circuit. The first interlayer insulating layer 13 has a surface with a concave-convex shape. Thus, the first interlayer insulating layer 13 has a concave-convex surface structure. The first interlayer insulating layer 13 having the concave-convex surface structure may be formed by using a photosensitive resin, as described, for example, in JP 3394926 B.

The reflective electrode 12 is provided on the first interlayer insulating layer 13. The reflective electrode 12 is formed from a metal material with high reflectance. Here, a silver alloy is used as the metal material for forming the reflective electrode 12, but the present disclosure is not limited to this, and for example, aluminum or an aluminum alloy may be used. The surface of the reflective electrode 12 has a concave-convex shape corresponding to the concave-convex surface structure of the first interlayer insulating layer 13. In other words, the reflective electrode 12 also has a concave-convex surface structure. The concave-convex surface structure of the reflective electrode 12 is provided to diffusely reflect ambient light to achieve display similar to paper white. The concave-convex surface structure can, for example, be constituted by a plurality of convex portions p arranged randomly such that a center spacing between adjacent convex portions p is 5 μm or more and 50 μm or less, and preferably 10 μm or more and 20 μm or less. When viewed from the normal direction of the substrate 10a, the shapes of the convex portions p are substantially circular or substantially polygonal. The area of the convex portions p occupying the pixel P is, for example, from approximately 20% to 40%. The height of the convex portions p is 1 μm or more and 5 μm or less, for example.

The second interlayer insulating layer 14 is a transparent insulating layer provided to cover the reflective electrode 12.

The pixel electrode 11 is provided on the second interlayer insulating layer 14. Thus, the pixel electrode 11 is provided on the reflective electrode 12 with the transparent insulating layer 14 interposed therebetween. The pixel electrode 11 is formed from a transparent conductive material. As the transparent conductive material, for example, indium tin oxide (ITO), indium zinc oxide (IZO (trade name)), or a mixture thereof may be used. The pixel electrode 11 is electrically connected to a backplane circuit including a memory circuit. A portion of the pixel electrode 11 is located in the transmissive region Tr, and a portion of the pixel electrode 11 is located in the reflective region Rf.

The contact portion CP electrically connects the pixel electrode 11 and the backplane circuit in a first contact hole CH1 formed in the first interlayer insulating layer 13 and a second contact hole CH2 formed in the second interlayer insulating layer 14. In the illustrated example, the contact portion CP includes a first contact electrode 16, a second contact electrode 17, and a third contact electrode 18.

The first contact electrode 16 is an electrode (or a portion of wiring) exposed in the first contact hole CH1. The second contact electrode 17 is formed on the first interlayer insulating layer 13 and in the first contact hole CH1, and is connected to the first contact electrode 16 in the first contact hole CH1. The second contact electrode 17 is partially exposed in the second contact hole CH2. In the second contact hole CH2, the third contact electrode 18 is connected to the second contact electrode 17 and the pixel electrode 11. In other words, the third contact electrode 18 is interposed between the second contact electrode 17 and the pixel electrode 11. In the illustrated example, the conductive layer 19 formed from the same conductive film as the second contact electrode 17 (that is, in the same layer as the second contact electrode 17) is interposed between the reflective electrode 12 and the first interlayer insulating layer 13. The third contact electrode 18 is formed from the same metal film as the reflective electrode 12 (that is, in the same layer as the reflective electrode 12). The conductive layer 19 and the third contact electrode 18 may be omitted.

The counter substrate 20 includes a counter electrode (common electrode) 21 and a second alignment film 25. The counter substrate 20 further includes a color filter layer and a plurality of columnar spacers (both not illustrated). The constituent elements of the counter substrate 20 (the counter electrode 21 and the like described above) are supported by a substrate 20a. The substrate 20a is, for example, a glass substrate or a plastic substrate. Note that the counter substrate 20 does not have a black matrix (light-shielding layer) between any two pixels P adjacent to each other.

The counter electrode 21 is provided to be opposite to the pixel electrode 11 and the reflective electrode 12. The counter electrode 21 is formed from a transparent conductive material. A material similar to that of the pixel electrode 11 can be used as the transparent conductive material for forming the counter electrode 21.

The color filter layer typically includes a red color filter provided in a region corresponding to a red pixel $P_R$, a green color filter provided in a region corresponding to the green pixel $P_G$, and a blue color filter provided in a region corresponding to the blue pixel $P_B$. The red color filter, green color filter, and blue color filter transmit red light, green light, and blue light, respectively.

The columnar spacer defines the thickness (cell gap) of the liquid crystal layer 30. The columnar spacer can be formed from a photosensitive resin.

The liquid crystal layer 30 includes a nematic liquid crystal material having negative dielectric anisotropy, and a chiral agent. The liquid crystal layer 30 can be formed, for example, by the falling drop method.

The first alignment film 15 and the second alignment film 25 are each provided to be in contact with the liquid crystal layer 30. Here, each of the first alignment film 15 and the second alignment film 25 is a vertical alignment film. At least one of the first alignment film 15 and the second alignment film 25 is subjected to the alignment processing and defines a pretilt azimuthal direction. Liquid crystal molecules 31 of the liquid crystal layer 30 are vertically aligned in a state where no voltage is applied to the liquid crystal layer 30 (see FIG. 2A), and tilt to be in twisted alignment when a predetermined voltage is applied to the liquid crystal layer 30. The liquid crystal layer 30 is a vertical alignment liquid crystal layer as described above.

Although not illustrated in this example, the liquid crystal display device 100 further includes a pair of polarizers disposed on the back surface side of the TFT substrate 10 and the observer side of the counter substrate 20. The pair of polarizers are arranged so that display is performed a normally black mode, for example.

The reflective electrode 12 includes a first region 12a located within each of the plurality of pixels P and a second region 12b located between any two pixels P adjacent to each other. The concave-convex surface structure of the reflective electrode 12 is formed in each of the first region 12a and the second region 12b. Thus, not only the first region 12a but also the second region 12b has a concave-convex surface structure.

The liquid crystal display device 100 has a configuration for performing gray scale display with the memory liquid crystal. Specifically, each pixel P of the liquid crystal display device 100 is divided into a plurality of subpixels Sp, as illustrated in FIG. 1. FIG. 1 illustrates an example in which one pixel P is divided into three subpixels Sp. In this example, the pixel electrode 11 is divided into three subpixel electrodes 11a. Of the three subpixel electrodes 11a, the two subpixel electrodes 11a disposed on the upper side and the lower side in the drawing are electrically connected to a single common memory circuit, and one subpixel electrode 11a disposed at the center of the diagram is electrically connected to another memory circuit. In other words, two memory circuits are provided for each pixel P.

Figure 3:
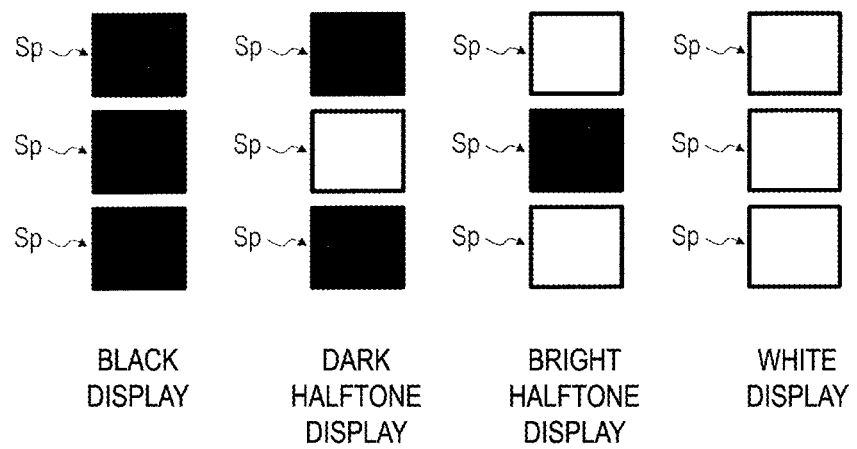
FIG. 3 is a diagram illustrating an example of a gray scale display using the configuration illustrated in FIG. 1.

With the pixel P divided as illustrated in FIG. 1, the four gray scale display may be implemented by an area gradient method as illustrated in FIG. 3. Specifically, as illustrated on the leftmost part in FIG. 3, by setting all three subpixels Sp to the black display state, the entire pixel P can be displayed in black. As illustrated second from the left in FIG. 3, by setting two subpixels Sp to the black display state and one subpixel Sp to the white display state, a dark halftone display can be performed for the entire pixel P. As illustrated third from the left in FIG. 3, by setting two subpixels Sp to the white display state and one subpixel Sp to the black display state, a bright halftone display can be performed for the entire pixel P. As illustrated on the rightmost part in FIG. 3, by setting all three subpixels Sp to the white display state, the entire pixel P can be displayed in white.

Note that the three subpixel electrodes 11a may be electrically connected respectively to different memory circuits (that is, three memory circuits may be provided for each pixel P).

In the liquid crystal display device 100, any of the following drive modes is used.

Mode (A): voltage of the same polarity is applied to the liquid crystal layers 30 of any two pixels P adjacent to each other along the row direction, among the plurality of pixels P. This is a drive mode known as row line inversion drive (H-line inversion drive), and also includes a mode in which polarity is reversed for each set of a plurality of rows (such as 2H-line inversion driving).

Mode (B): voltage of the same polarity is applied to the liquid crystal layers 30 of any two pixels P adjacent to each other along the column direction, among the plurality of pixels P. This is a drive mode known as column line inversion drive (V-line inversion drive), and also includes a mode in which polarity is reversed for each set of a plurality of columns (such as 2V-line inversion driving).

Mode (C): voltage of the same polarity is applied to the liquid crystal layers 30 of all of the plurality of pixels P. This is a drive mode known as field inversion driving (frame inversion driving).

In the liquid crystal display device 100, the reflective electrode 12 is in an electrically floating state (in a floating state). With this configuration, as described below, the time average of the voltage applied between the pixel electrode 11 and the reflective electrode 12 is substantially the same between the maximum gray scale display state (white display state) and the minimum gray scale display state (black display state).

As described above, in the liquid crystal display device 100 of the present embodiment, the reflective electrode 12 not only includes the first region 12a located in the pixel P, but also includes the second region 12b located between two adjacent pixels P. Therefore, the region between the pixels P can also contribute to the reflection display so that the reflectance opening ratio (the ratio occupied by the region contributing to display of the reflection mode in the display region) is improved, whereby the reflectance can be further improved. Thus, even brighter display can be implemented in the reflection mode. Note that in a known reflective liquid crystal display device, the pixel electrode is a reflective electrode (the reflective electrode functions as a pixel electrode), and thus the reflective electrode cannot be disposed between pixels.

Furthermore, the liquid crystal display device 100 of the present embodiment may solve the following problems in a known transflective liquid crystal display device.

A known configuration of a transflective liquid crystal display device has a region between adjacent pixels used for display in the transmission mode. However, since there is no pixel electrode between pixels, the liquid crystal molecules located between the pixels cannot be aligned sufficiently in the desired direction, and thus there has been a problem in that the transmittance is low. In addition, a section between pixels includes regions in which the alignment as a result of an oblique electric field generated near the edge of the pixel electrode is not well aligned with the alignment as a result of rubbing processing, meaning that the liquid crystal molecules are unstably aligned. As described above, the regions in which the pixels are unstably aligned have been used for display in the transmission mode, and thus poor display (such as afterimage) caused by the poor alignment has occurred in display in the transmission mode. Furthermore, an impact of the change in alignment due to the concave-convex surface structure of the reflective electrode reaches the region between the pixels (the region used for transmission display), which is also another cause of poor display.

On the other hand, in the liquid crystal display device 100 of the present embodiment, since the pixel electrode 11 is provided in the transmissive region Tr, the liquid crystal molecules in the transmissive region Tr can be sufficiently aligned in a desired direction. Thus, transmittance is improved.

Furthermore, a region with stable alignment is used for display in the transmission mode, and the pixel electrode 11 does not need to have a concave-convex surface structure (only the reflective electrode 12 provided separately from the pixel electrode 11 needs to have the concave-convex surface structure). Thus, poor display caused by the poor alignment in display in the transmission mode can be improved.

Furthermore, in the liquid crystal display device 100 of the present embodiment, driving is performed in any of the modes (A), (B), and (C) described above. As a result, reflectance (brighter display) can be more effectively improved. The reasons for this will be described below.

As the drive mode for a liquid crystal display device, a method called dot inversion driving is well known and widely used. With dot inversion driving, voltages of different polarities are applied to the liquid crystal layers of any two pixels adjacent to each other, among the plurality of pixels. Thus, the polarity of the applied voltage is reversed for each pixel along the row direction, and the polarity of the applied voltage is reversed for each pixel along the column direction. In a case where the polarity of the voltage applied to the liquid crystal layer between adjacent pixels is reversed, as in the case of the dot inversion driving, the liquid crystal molecules located between the pixels may not be aligned in a way that contributes to brightness, due to the effect of the oblique electric field generated between the pixels.

On the other hand, in the present embodiment, the polarity of the applied voltage is the same (not inverted) between adjacent pixels P along at least one of the row direction and the column direction. Thus, the liquid crystal molecules 31 located between the pixels P to which the voltages of the same polarity are applied can be aligned to contribute to brightness. As a result, the reflectance can be more effectively improved. Note that for achieving even greater improvement in reflectance, the mode (C) is more preferable than the modes (A) and (B). Specifically, the field inversion drive in which a voltage of the same polarity is applied to the liquid crystal layers 30 of all of the plurality of pixels P is preferable.

As described above, in the present embodiment, the reflective electrode 12 is in the floating state.

Alternatively, the reflective electrode may be provided with the same potential as the potential provided to the counter electrode (common potential). Additionally, the inventors of the present application also considered providing the reflective electrode with the same potential as the potential (white display potential) provided to the pixel electrode during the maximum gray scale display. However, in both cases, in black/white fixed pattern display (burn-in test) in a high temperature environment, the flickering state is different between the black display portion and the white display portion, and it was found that the burn-in is visible when observed in an all-white display with low frequency driving such as 0.5 Hz driving. The burn-in as described above may not occur with a higher drive frequency such as 30 Hz, but this results in a larger power consumption.

It is believed that the burn-in occurs due to a difference between the black display portion and the white display portion, in the application of voltage between the reflective electrode and the pixel electrode. When a common potential is provided to the reflective electrode, there is no potential difference between the reflective electrode and the pixel electrode during black display, but there is a potential difference between the reflective electrode and the pixel electrode during white display. When a white display potential is provided to the reflective electrode, there is no potential difference between the reflective electrode and the pixel electrode during white display, but there is a potential difference between the reflective electrode and the pixel electrode during black display. It is believed that the difference in the voltage application between the display modes affects the alignment state of the liquid crystal molecules as the fixed pattern display continues at a low frequency, resulting in burn-in.

On the other hand, when the reflective electrode 12 is in the floating state as in the present embodiment, the time average of the voltage applied between the reflective electrode 12 and the pixel electrode 11 is the same in the white display state and the black display state, as described below. As a result, the occurrence of burn-in is suppressed, whereby low frequency driving can be suitably performed.

Validation Results for Burn-In Suppression Effect

The liquid crystal display device 100 of the present embodiment (Example 1) was manufactured and the results of verifying the effect of suppressing burn-in will be described. The fabricated liquid crystal display device 100 had a screen size of the 1.2 inches, and the size of one pixel P was 126 μm (vertical)×42 μm (horizontal). Of the first alignment film 15 of the TFT substrate 10 and the second alignment film 25 of the counter substrate 20, the rubbing processing was performed only on the second alignment film 25. As a result, the pretilt azimuthal direction was defined by only the second alignment film 25 of the first alignment film 15 and the second alignment film 25. The thickness (cell gap) of the liquid crystal layer 30 was 3 μm, and a chiral agent was added to the liquid crystal material of the liquid crystal layer 30 to achieve a twist angle of 70° upon application of a white voltage. A circular polarizer was disposed on each of the back surface side of the TFT substrate 10 and the observer side of the counter substrate 20. Field inversion driving (mode (C)) was used as the drive mode.

Table 1 shows the potentials provided to the counter electrode 21, the pixel electrode 11, and the reflective electrode 12 in Example 1. Note that "positive polarity" and "negative polarity" in Table 1 mean that the voltage applied to the liquid crystal layer 30 was positive and negative, respectively.

TABLE 1

| | Example 1 | | | |
|---|---|---|---|---|
| Potential | White display | | Black display | |
| provided (V) | Positive polarity | Negative polarity | Positive polarity | Negative polarity |
| Counter electrode | 0 | 3 | 0 | 3 |
| Pixel electrode | 3 | 0 | 0 | 3 |
| Reflective electrode | Floating | Floating | Floating | Floating |

By periodically switching between the potential corresponding to the positive polarity and the potential corresponding to the negative polarity in Table 1, a positive polarity voltage (+3 V) and a negative polarity voltage (−3 V) are alternately applied to the liquid crystal layer 30 (between the pixel electrode 11 and the counter electrode 21) during white display. As shown in Table 1, the reflective electrode 12 is in the floating state. Regarding the voltage (potential difference) between the pixel electrode 11 and the reflective electrode 12, the positive polarity of the white display and the negative polarity of the black display are the same (in both cases, the pixel electrodes 11 have a potential of 3 V and the reflective electrode 12 is in the floating state) and the negative polarity of the white display and the positive polarity of the black display are the same (in both cases, the pixel electrodes 11 have a potential of 0 V, and the reflective electrode 12 is in the floating state). This means that, in the white display state and the black display state, the time average of the voltage applied is substantially the same between the pixel electrode 11 and the reflective electrode 12.

Liquid crystal display devices of Comparative Examples 1 and 2 were prepared for comparison with Example 1. Comparative Example 1 differs from Example 1 in that the same potential is provided to the counter electrode and the reflective electrode. Comparative Example 2 differs from Example 1 in that the reflective electrode is provided with a white display potential. Table 2 and Table 3 show the potentials provided to the counter electrode, the pixel electrode, and the reflective electrode in Comparative Examples 1 and 2.

TABLE 2

| | Comparative Example 1 | | | |
|---|---|---|---|---|
| Potential | White display | | Black display | |
| provided (V) | Positive polarity | Negative polarity | Positive polarity | Negative polarity |
| Counter electrode | 0 | 3 | 0 | 3 |
| Pixel electrode | 3 | 0 | 0 | 3 |
| Reflective electrode | 0 | 3 | 0 | 3 |

TABLE 3

| | Comparative Example 2 | | | |
|---|---|---|---|---|
| Potential | White display | | Black display | |
| provided (V) | Positive polarity | Negative polarity | Positive polarity | Negative polarity |
| Counter electrode | 0 | 3 | 0 | 3 |
| Pixel electrode | 3 | 0 | 0 | 3 |
| Reflective electrode | 3 | 0 | 3 | 0 |

In Comparative Example 1, as shown in Table 2, there is a potential difference between the pixel electrode and the reflective electrode during white display, whereas there is no potential difference between the pixel electrode and the reflective electrode during black display. In Comparative Example 2, as shown in Table 3, there is no potential difference between the pixel electrode and the reflective electrode during white display, whereas there is a potential difference between the pixel electrode and the reflective electrode during black display. As described above, in both Comparative Examples 1 and 2, the application of the voltage between the pixel electrode and the reflective electrode differ between white display and black display.

For Example 1 and Comparative Examples 1 and 2, white and black fixed checker patterns were continuously displayed for 750 hours at an environmental temperature of 75° C., and then full screen white display was performed to measure the flicker values of the portions displaying white and black. Furthermore, in this state, it was evaluated whether or not the burn-in (trace of the checker pattern) was visible by visual observation. The flicker value was evaluated specifically in the following manner. First of all, the change in brightness during white display was measured. Since the brightness changes periodically with the polarity switching, a maximum value Bmax, a minimum value Bmin, and an average value Bave of the brightness were determined, and a flicker value F was obtained by substituting them into the following formula. Table 4 shows the results of measuring the flicker value and visual evaluation.

$$F = 10 \log_{10}\{(B\text{max} - B\text{min})/B\text{ave}\}$$

TABLE 4

| | Flicker value (dB) | | |
|---|---|---|---|
| | White display portion | Black display portion | Visual evaluation |
| Example 1 | −18.5 | −18.0 | No burn-in |
| Comparative Example 1 | −22.3 | −16.5 | Burn-in observed |
| Comparative Example 2 | −12.9 | −19.5 | Burn-in observed |

As illustrated in Table 4, in Example 1, the difference in flicker values between the white display portion and the black display portion was small compared with Comparative Examples 1 and 2. In Comparative Examples 1 and 2, the burn-in was visually confirmed, whereas no burn-in was found by visual evaluation in Example 1.

Thus, in Example 1, the burn-in was suppressed. This is thought to be due to the fact that the time average of the voltage applied between the pixel electrode 11 and the reflective electrode 12 is substantially the same in the white display state and the black display state, resulting in a smaller difference in flicker values between the white display portion and the black display portion.

Note that although a configuration in which the reflective electrode 12 is in the floating state is described, the ground potential may be provided to the reflective electrode 12. Also, when the ground potential is provided to the reflective electrode 12, the time average of the voltage applied between the reflective electrode 12 and the pixel electrode 11 can be the same in the white display state and the black display state. As a result, the occurrence of burn-in can be suppressed, and low frequency driving can be suitably performed. Results of verifying the effect of suppressing the burn-in will be described for the configuration in which the ground potential is provided to the reflective electrode 12 (Example 2).

Table 5 shows the potentials provided to the counter electrode 21, the pixel electrode 11, and the reflective electrode 12 in Example 2.

TABLE 5

| | Example 2 | | | |
|---|---|---|---|---|
| Potential | White display | | Black display | |
| provided (V) | Positive polarity | Negative polarity | Positive polarity | Negative polarity |
| Counter electrode | 0 | 3 | 0 | 3 |
| Pixel electrode | 3 | 0 | 0 | 3 |
| Reflective electrode | 0 | 0 | 0 | 0 |

By periodically switching between the potential corresponding to the positive polarity and the potential corresponding to the negative polarity in Table 5, a positive polarity voltage (+3 V) and a negative polarity voltage (−3 V) are alternately applied to the liquid crystal layer 30 (between the pixel electrode 11 and the counter electrode 21) during white display. As shown in Table 5, the potential provided to the reflective electrode 12 is always 0 V regardless of the ground potential, that is, polarity. Regarding the voltage (potential difference) between the pixel electrode 11 and the reflective electrode 12, the positive polarity of the white display and the negative polarity of the black display are the same (in both cases, the pixel electrodes 11 have a potential of 3 V and the reflective electrode 12 has a potential of 0 V) and the negative polarity of the white display and the positive polarity of the black display are the same (in both cases, the pixel electrodes 11 have a potential of 0 V, and the reflective electrode 12 has a potential of 0 V). This means that, in the white display state and the black display state, the time average of the voltage applied is substantially the same between the pixel electrode 11 and the reflective electrode 12.

Table 6 shows the results of measuring the flicker value and visual evaluation for Example 2.

TABLE 6

| | Flicker value (dB) | | |
|---|---|---|---|
| | White display portion | Black display portion | Visual evaluation |
| Example 1 | −19.0 | −17.9 | No burn-in |
| Comparative Example 1 | −22.3 | −16.5 | Burn-in observed |
| Comparative Example 2 | −12.9 | −19.5 | Burn-in observed |

As shown in Table 6, also in Example 2, the difference in flicker values between the white display portion and the black display portion was small compared with Comparative Examples 1 and 2. In Comparative Examples 1 and 2, the burn-in was visually confirmed, whereas no burn-in was found by visual evaluation in Example 2.

Thus, in Example 2, the burn-in was suppressed. This is thought to be due to the fact that the time average of the voltage applied between the pixel electrode 11 and the reflective electrode 12 is substantially the same in the white display state and the black display state, resulting in a smaller difference in flicker values between the white display portion and the black display portion.

Note that in the liquid crystal display device 100 of the present embodiment, the region between the pixels P contributes to the display in the reflection mode. Thus, the counter substrate 20 preferably does not include a black matrix between any two pixels P, of the plurality of pixels P, adjacent to each other.

In addition, in the present embodiment, the transparent insulating layer 14 is provided to cover the reflective electrode 12, and the pixel electrode 11 formed from the transparent conductive material is disposed on the transparent insulating layer 14. Thus, the pixel electrode 11 formed from the transparent conductive material and the counter electrode 21 formed from the transparent conductive material face each other with the liquid crystal layer 30 interposed in between. On the other hand, in a typical reflective liquid crystal display device, the pixel electrode is a reflective electrode, and thus a pixel electrode (reflective electrode) formed from a metal material and a counter electrode formed from a transparent conductive material are provided opposite to each other with a liquid crystal layer interposed therebetween. Thus, flickering may occur due to the difference in work function between the metal material and the transparent conductive material. In the present embodiment, the pixel electrode 11 and the counter electrode 21 are formed from the same type of electrode material (both are formed from a transparent conductive material), whereby such occurrence of flickering is suppressed.

Other Aspects

Here, a backplane circuit having a memory circuit for each pixel P is described, but the backplane circuit is not limited to this example. The backplane circuit may include a TFT connected to the pixel electrode 11, and a gate bus line, a source bus line, and the like connected to the TFT, as in a typical active matrix substrate. The TFT is, for example, a TFT having an oxide semiconductor layer including an amorphous silicon layer, a polysilicon layer, or an In—Ga—Zn—O-based semiconductor (see JP 2014-007399 A) as an active layer. JP 2014-007399 A is incorporated herein by reference.

Although an example where only one of the vertical alignment films may be in a VA-HAN mode, which defines the pretilt azimuthal direction, has been given, both of the vertical alignment films may be in a VA-TN mode which defines the pretilt azimuthal direction.

Although a configuration is described in which the cell gap dt in the transmissive region Tr and the cell gap dr in the reflective region Rf are the same, a configuration in which the cell gap dt of the transmissive region Tr is greater than the cell gap dr of the reflective region Rf (that is, dt>dr) may be employed.

Light used for display in the transmission mode passes through the liquid crystal layer 30 only once, whereas the light used for display in the reflection mode passes through the liquid crystal layer 30 twice. Thus, when the cell gap dt of the transmissive region Tr is greater than the cell gap dr of the reflective region Rf, retardation of the liquid crystal layer 30 for the light used to display in the transmission mode and the light used to display in the reflection mode can be made close. Thus, a voltage-luminance characteristic is obtained that is preferable for both the transmissive region Tr and the reflective region Rf (enabling brighter display).

For implementing brighter display in both the transmissive region Tr and the reflective region Rf, the cell gap dt of the transmissive region Tr and the cell gap dr of the reflective region Rf preferably substantially satisfy the relationship dt=2dr.

Moreover, although the configuration in which each pixel P is divided into a plurality of subpixels Sp is described, each of the pixels P need not be divided into a plurality of subpixels Sp.

Second Embodiment

Figure 4:
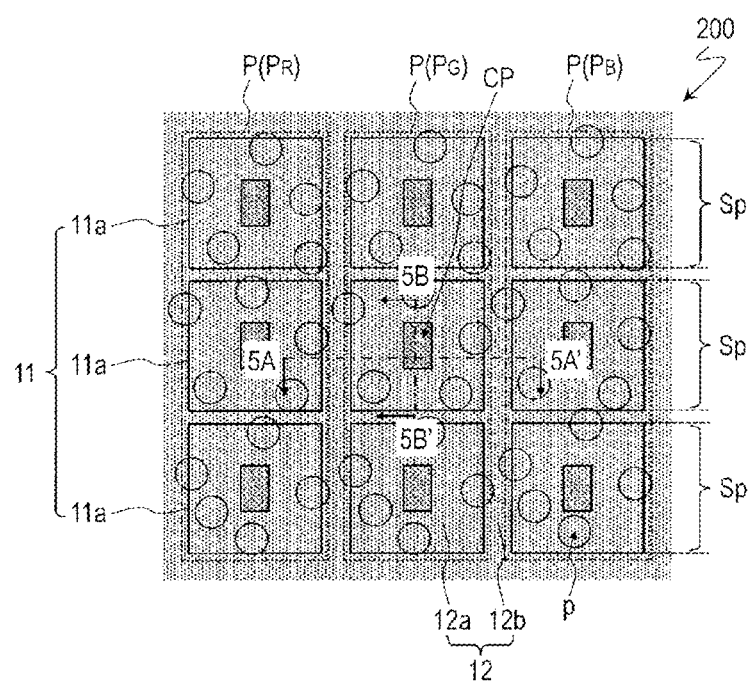
FIG. 4 is a plan view schematically illustrating another liquid crystal display device 200 according to an embodiment of the present disclosure and illustrates a region corresponding to three pixels P of the liquid crystal display device 200.
Figure 5A:
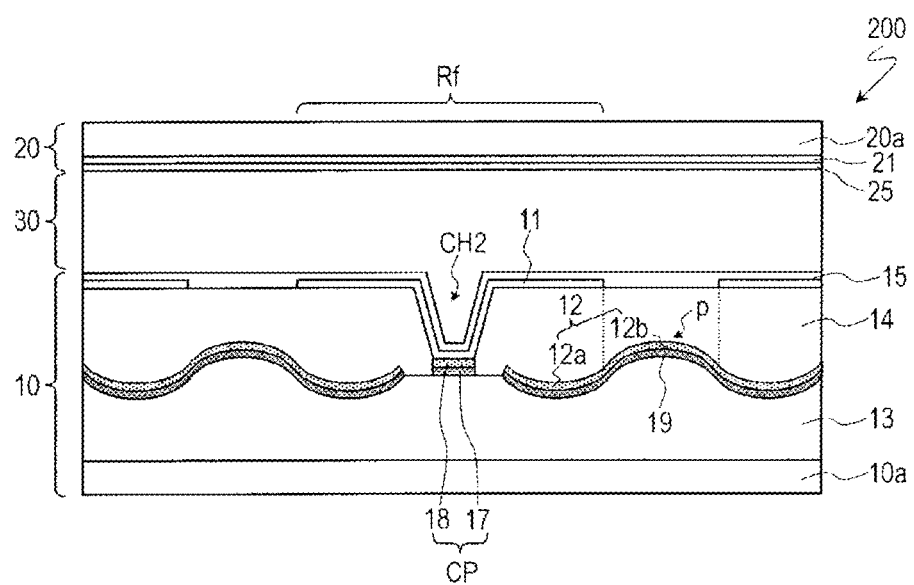
FIG. 5A is a cross-sectional view schematically illustrating the liquid crystal display device 200 and illustrates a cross-sectional structure along a line 5A-5A' in FIG. 4.
Figure 5B:
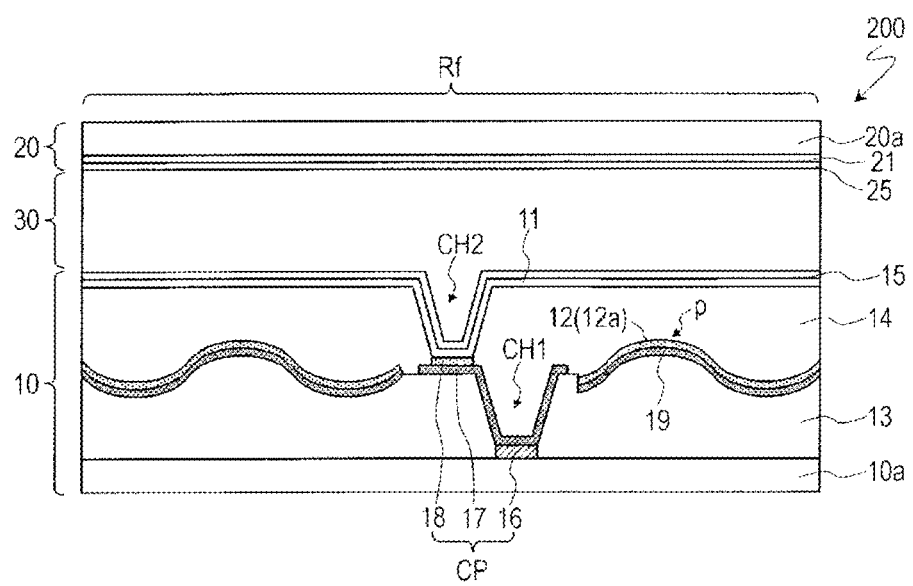
FIG. 5B is a cross-sectional view schematically illustrating the liquid crystal display device 200 and illustrates a cross-sectional structure along the a line 5B-5B' in FIG. 4.

A liquid crystal display device 200 according to the present embodiment will be described with reference to FIGS. 4, 5A, and 5B. The liquid crystal display device 200 of the present embodiment is a reflective liquid crystal display device. FIG. 4 is a plan view schematically illustrating the liquid crystal display device 200 and illustrates the region corresponding to three pixels P of the liquid crystal display device 200. FIG. 5A and FIG. 5B are cross-sectional views schematically illustrating the liquid crystal display device 200 and illustrate cross-sectional structures along the lines 5A-5A' and 5B-5B' in FIG. 4, respectively. The following description will primarily focus on differences between the liquid crystal display device 200 of the present embodiment and the liquid crystal display device 100 of the first embodiment.

The liquid crystal display device 200 of the present embodiment differs from the liquid crystal display device 100 of the first embodiment in that each of the plurality of pixels P does not include the transmissive region Tr.

Also, in the liquid crystal display device 200 of the present embodiment, since the reflective electrode 12 includes a second region 12b located between two adjacent pixels P, the region between the pixels P can also contribute to the reflective display. As a result, the reflection opening ratio is improved, whereby the reflectance can be further improved. By performing the driving in any of the modes (A), (B), and (C) described above, reflectance can be more effectively improved (brighter display).

Furthermore, in the liquid crystal display device 200 of the present embodiment, the time average of the voltage applied between the reflective electrode 12 and the pixel electrode 11 is the same in the white display state and the black display state, whereby the occurrence of burn-in can be suppressed, and low-frequency driving can be suitably performed.

Third Embodiment

Figure 6:
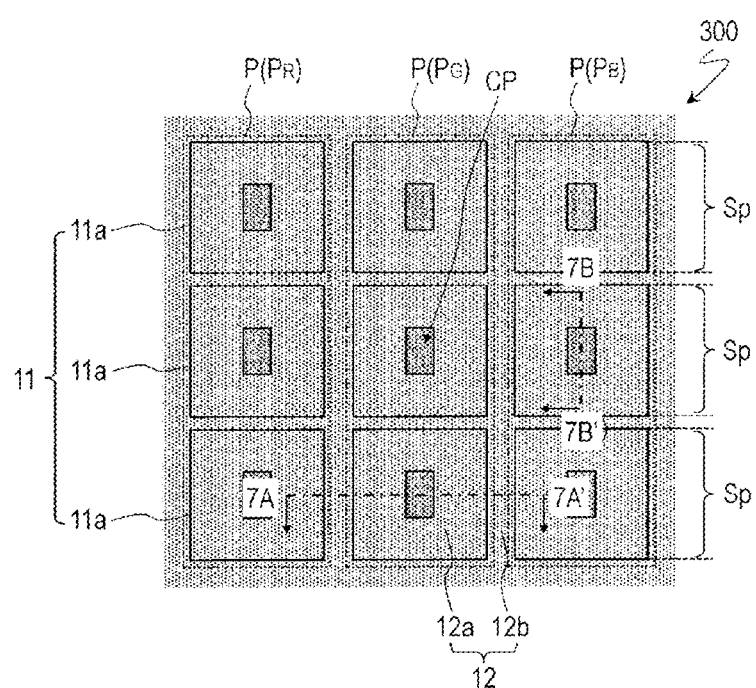
FIG. 6 is a plan view schematically illustrating yet another liquid crystal display device 300 according to an embodiment of the present disclosure and illustrates a region corresponding to three pixels P of the liquid crystal display device 300.
Figure 7A:
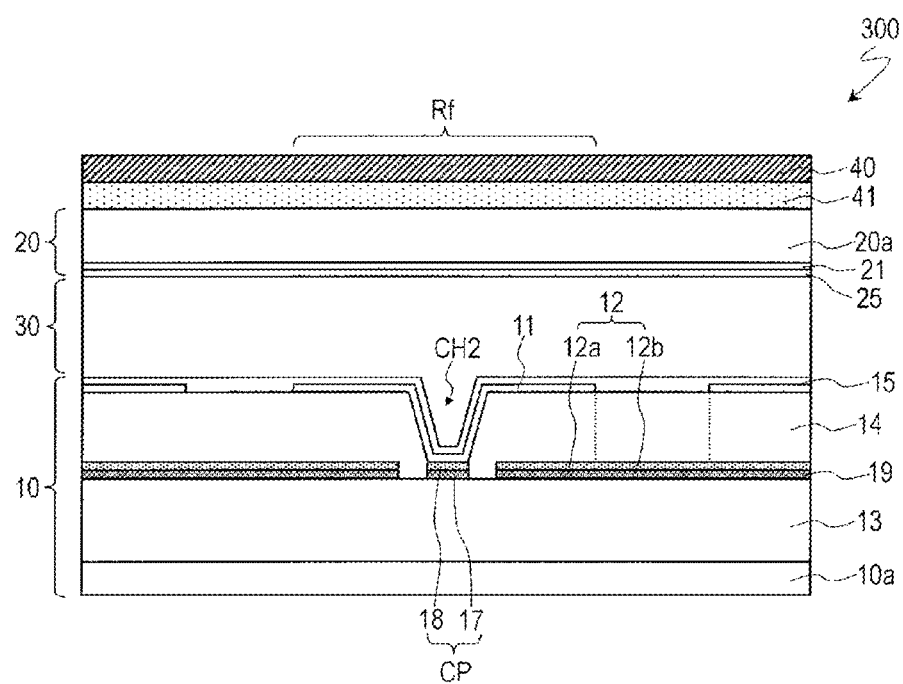
FIG. 7A is a cross-sectional view schematically illustrating the liquid crystal display device 300, and illustrates a cross-sectional structure taken along a line 7A-7A' in FIG. 6.
Figure 7B:
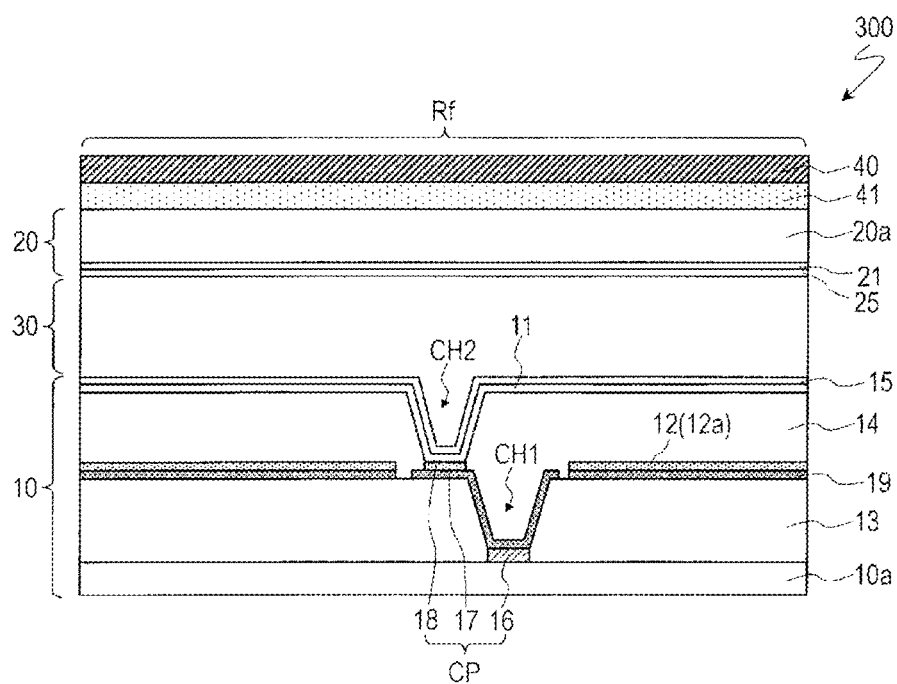
FIG. 7B is a cross-sectional view schematically illustrating the liquid crystal display device 300, and illustrates a cross-sectional structure taken along a line 7B-7B' in FIG. 6.

A liquid crystal display device 300 according to the present embodiment will be described with reference to FIGS. 6, 7A, and 7B. FIG. 6 is a plan view schematically illustrating the liquid crystal display device 300 and illustrates a region corresponding to three pixels P in the liquid crystal display device 300. FIG. 7A and FIG. 7B are cross-sectional views schematically illustrating the liquid crystal display device 300 and illustrate cross-sectional structures along the lines 7A-7A' and 7B-7B' in FIG. 6, respectively. The following description will primarily focus on differences between the liquid crystal display device 300 of the present embodiment and the liquid crystal display device 200 of the second embodiment.

The reflective layer 12 of the liquid crystal display device 300 is formed on the first interlayer insulating layer 13 that does not have a concave-convex shape (and thus is flat). Thus, the reflective layer 12 does not have a concave-convex surface structure, and functions as a specular reflective layer.

The liquid crystal display device 300 further includes a circular polarizer 40 disposed on an observer side of the counter substrate 20, and a light scattering layer 41 disposed more on the observer side than the liquid crystal layer 30.

The light scattering layer 41 is, for example, an anisotropic light scattering film. In the illustrated example, the light scattering layer 41 is disposed between the substrate 20*a* and the circular polarizer 40.

In this embodiment, light can be scattered by the light scattering layer 41 to achieve display to close to paper white.

INDUSTRIAL APPLICABILITY

The embodiments of the present disclosure can be broadly applied to a liquid crystal display device (that is, a reflective liquid crystal display device and a transflective liquid crystal display device) including a reflective region in which pixels perform display in a reflection mode.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device comprising:
a first substrate;
a second substrate opposite to the first substrate;
a vertical alignment liquid crystal layer provided between the first substrate and the second substrate; and
a plurality of pixels arranged in a matrix shape including a plurality of rows and a plurality of columns,
wherein each of the plurality of pixels includes a reflective region for performing display in a reflection mode,
the first substrate includes
a reflective electrode including a first region located within each of the plurality of pixels and a second region located between any two pixels, of the plurality of pixels, adjacent to each other,
a transparent insulating layer provided to cover the reflective electrode, and
a pixel electrode formed from a transparent conductive material and provided on the transparent insulating layer in each of the plurality of pixels,
the second substrate includes a counter electrode provided opposite to the pixel electrode and the reflective electrode,
voltage of the same polarity is applied to the liquid crystal layer of any two pixels, of the plurality of pixels, adjacent to each other along a row direction, any two pixels, of the plurality of pixels, adjacent to each other along a column direction, or all of the plurality of pixels, and
a time average of voltage applied between the pixel electrode and the reflective electrode is substantially the same in a maximum gray scale display state and a minimum gray scale display state.

2. The liquid crystal display device according to claim 1, wherein the reflective electrode is in an electrically floating state.

3. The liquid crystal display device according to claim 1, wherein a ground potential is provided to the reflective electrode.

4. The liquid crystal display device according to claim 1, wherein each of the plurality of pixels further includes a transmissive region for performing display in a transmission mode, and
the pixel electrode is partially located in the transmissive region.

5. The liquid crystal display device according to claim 1, wherein the counter electrode is formed from a transparent conductive material.

6. The liquid crystal display device according to claim 1, wherein the first region and the second region of the reflective electrode each have a concave-convex surface structure.

7. The liquid crystal display device according to claim 1 further comprising:
a light scattering layer provided more on an observer side than the liquid crystal layer.

8. The liquid crystal display device according to claim 1, further comprising:
memory circuits connected to the plurality of pixels, respectively.

* * * * *